United States Patent
Kurosawa et al.

(10) Patent No.: US 8,882,944 B2
(45) Date of Patent: Nov. 11, 2014

(54) METHOD FOR FORMING RUSTPROOF FILM ON PC STRAND AND PC STRAND

(71) Applicant: Kurosawa Construction Co., Ltd., Tokyo (JP)

(72) Inventors: Ryohei Kurosawa, Tokyo (JP); Kei Hirai, Tokyo (JP); Naoki Matsubara, Tokyo (JP)

(73) Assignee: Kurosawa Construction Co., Ltd., Tokyo (JP)

( * ) Notice: Subject to any disclaimer, the term of this patent is extended or adjusted under 35 U.S.C. 154(b) by 0 days.

(21) Appl. No.: 13/913,583

(22) Filed: Jun. 10, 2013

(65) Prior Publication Data
US 2014/0034208 A1  Feb. 6, 2014

(30) Foreign Application Priority Data
Aug. 2, 2012  (JP) ................ 2012-171796

(51) Int. Cl.
| H01B 13/16 | (2006.01) |
| C09D 5/08 | (2006.01) |
| D07B 7/14 | (2006.01) |
| D07B 7/18 | (2006.01) |
| E04C 5/01 | (2006.01) |
| E04C 5/08 | (2006.01) |
| B05D 7/20 | (2006.01) |
| B05D 1/06 | (2006.01) |

(52) U.S. Cl.
CPC *C09D 5/08* (2013.01); *D07B 7/145* (2013.01); *D07B 7/18* (2013.01); *E04C 5/015* (2013.01); *E04C 5/08* (2013.01); *B05D 7/20* (2013.01); *B05D 1/06* (2013.01); *D07B 2201/2012* (2013.01); *D07B 2201/2023* (2013.01); *D07B 2201/2059* (2013.01); *D07B 2201/2065* (2013.01); *D07B 2205/206* (2013.01); *D07B 2207/4059* (2013.01); *D07B 2207/4068* (2013.01); *D07B 2401/2025* (2013.01); *D07B 2501/2023* (2013.01)
USPC .................. 156/51; 29/885; 29/868

(58) Field of Classification Search
USPC ............. 156/51, 52, 53; 29/885, 603.25, 620, 29/623.5, 825, 827, 868, 869, 871, 872; 428/375, 378, 377, 384; 427/175, 180, 427/172, 177, 195, 197, 202, 203; 57/232, 57/233.1; 52/233.14, 857
See application file for complete search history.

(56) References Cited

U.S. PATENT DOCUMENTS

| 5,362,326 A | 11/1994 | Hasui et al. |
| 8,191,251 B2 * | 6/2012 | Kurosawa et al. ............. 29/885 |

(Continued)

FOREIGN PATENT DOCUMENTS

| JP | 09-096051 | 4/1997 |
| JP | 2691113 | 12/1997 |

(Continued)

*Primary Examiner* — Yogendra Gupta
*Assistant Examiner* — Vishal I Patel
(74) *Attorney, Agent, or Firm* — Wenderoth, Lind & Ponack, L.L.P.

(57) ABSTRACT

In a method for forming a rustproof film on a PC strand, the thickness of the resin film is set to 200±80 μm, the pre-heating is performed within a temperature range from 60 to 150° C. to prevent an occurrence of a cob-webbing phenomenon as a result of melting of the synthetic resin powder coating material and the post-heating is performed within a range from 150 to 250° C. in order to uniformize the thickness of the coats adhered to the outer peripheral surfaces of the core wire and the surrounding wires, and the temperature of the pre-heating is set to be lower than the temperature of the post-heating, and the synthetic resin powder coating material including particles having diameters in a range from 0.1 to 250 μm is used, and the line speed in the series of steps is set to 5 to 10 m/min.

2 Claims, 5 Drawing Sheets

(56) References Cited

U.S. PATENT DOCUMENTS

| | | | |
|---|---|---|---|
| 2004/0077784 A1* | 4/2004 | Ilenda et al. | 525/64 |
| 2011/0209345 A1* | 9/2011 | Kurosawa et al. | 29/885 |

FOREIGN PATENT DOCUMENTS

| | | |
|---|---|---|
| JP | 11-013210 | 1/1999 |
| JP | 3172486 | 6/2001 |
| JP | 2006-122808 | 5/2006 |
| JP | 2007-217823 | 8/2007 |
| JP | 2007-303030 | 11/2007 |
| JP | 2008-144324 | 6/2008 |
| JP | 4427602 | 3/2010 |
| JP | 2010-247148 | 11/2010 |
| JP | 4676009 | 4/2011 |

* cited by examiner

METHOD FOR FORMING RUSTPROOF FILM ON PC STRAND AND PC STRAND

BACKGROUND OF THE INVENTION

1. Field of the Invention

The present invention relates to a method for forming rustproof film with a synthetic resin powder coating material on a core wire and surrounding wires of a PC strand used as tensioning member or stay cable for post-tensioning or pre-tensioning in prestressed concrete used for structures such as architectural constructions and civil engineering structures, or of a PC strands used as stay member or stay cable for marine structures and cable-stayed bridges susceptible to salt corrosion, and a PC strand obtained by this method.

2. Prior Art

A PC strand generally has a twisted structure of plural surrounding wires twisted around a core wire. The reason for using such a structure is to impart flexibility to the PC strand, and to form helical grooves with the twisted surrounding wires and thus provide a sufficient shear resistance for wires embedded in concrete. Accordingly, there is a need for a rustproof processing method for the PC strand that does not interfere with these characteristics. Currently, a number of rustproof processing methods for the PC strand are known.

One example of such known conventional techniques is "Rustproof film forming and processing method for PC strand" disclosed in Japanese Patent 2691113. In this technique, twisted portions of a PC strand are temporarily untwisted in sequence. The untwisted portions are maintained with a spread maintaining means, and the excess core wire is adjusted. A deposition coating of synthetic resin powder coating material is then formed on whole outer peripheral surfaces of the untwisted core wire and surrounding wires. The deposition coatings are then heat-fused to form films on the whole outer peripheral surfaces of the core wire and surrounding wires. The core wire and the surrounding wires are then twisted again alter cooling the films.

Since the PC strand formed in this manner is formed with coats of 200 μm on the core wire and the surrounding wires by forming an adhesion film by spraying a powder coating material on the entire outer peripheral surfaces of the core wire and the surrounding wires respectively, and heating the adhesion film at a temperature of 250° C., characteristics such as flexibility required as the PC strand and shearing resistance with respect to concrete are not impaired at all and, in addition, the rustproofing function is also sufficient, so that this rustproofing method of this publication is thus praised as the ultimate rustproofing method of a PC strand.

Another known conventional technique is "Method of forming rustproof film on PC strand" disclosed in Japanese Patent No. 4676009. The method is performed in a series of line including: untwisting the PC strand and loosening surrounding wires from the core wire; forming a resin coat by applying a synthetic resin powder coating material on outer peripheral surfaces of the core wire and the surrounding wires in the loosened state respectively; heating the same to adhere each other uniformly and cooling the same; and subsequently twisting the surrounding wires around the core wire into an original state, wherein the heating includes a pre-heating before applying the synthetic resin powder coating material and a post-heating alter the application of the synthetic resin powder coating material, the temperature of the pre-heating is set within a range from 150 to 250° C. and the temperature of the post-heating is set within a range from 120 to 220° C., the temperature of the pre-heating is set to be 30 to 130° C. higher than the post-heating, the synthetic resin powder coating material having an average particle diameter of 40 to 50 μm is used in order to form the resin film having a predetermined thickness, and the speed of the line is set to 5 to 10 m/min.

In this manner, the temperature of the pre-heating is set to be higher than that of the post-heating, the synthetic resin powder coating material has an average particle diameter of 40 to 50 μm with that having particle diameters from 10 to 100 μm distributed substantially uniformly, and the line speed is set to 5 to 10 m/min, whereby the productivity is improved, cost reduction is achieved, and efficient formation of a uniform and preferable coat without impairing flexibility and a shearing resistance with respect to concrete is achieved.

In the first conventional technique described above, the thickness of the rustproof resin film is 200±50 μm, and the method in this technology is evaluated to be an ultimate rustproofing method. However, in order to form the resin film having the thickness described above, the line speed needs to be 4.5 m/min at maximum and, if the line speed is faster, than 4.5 m/min, a designed film thickness cannot be obtained, and hence a problem of low production efficiency exists.

In the second conventional technique, the temperature of the pre-heating needs to be set to be 30 to 130° C. higher than the temperature of the post-heating, and the synthetic resin powder coating material needs to be a selected powder coating material having particle diameters of 10 to 100 μm distributed substantially uniformly and having an average particle diameter in a range from 40 to 50 μm to be used. In addition, if the temperature of the pre-heating is increased, the powder coating material coated on the wires are abruptly heated and melted, and hence a hardening reaction of the powder coating material makes progress and hence the viscosity of the coating resin is increased before air present in gaps among the particles of the powder coating material being in contact with a basis material of the core wire or the surrounding wires goes out completely. Therefore, the air present in the gaps is trapped between the basis material and the coating resin and hence a foaming phenomenon occurs. The foaming phenomenon may result in formation of pinholes in the resin coating. Simultaneously, not only the probability of increase of trapped air bubbles increases with increase in particle diameter of the powder coating material and, furthermore, the probability of the formation of the pinholes is increased, but also the coat alter the application tends to be uneven and the texture of surface tends to be deteriorated. Accordingly, the average particle diameter of the powder coating material needs to be controlled within a selected or carefully selected range from 40 to 50 μm. If the control of the selected or carefully selected range of particle diameter of the powder coating material is neglected, since the temperature of the pre-heating is high, the air in the gaps among the particles is trapped and hence the probability of formation of the pinholes is increased due to the abrupt heating. Simultaneously, if the powder coating material does not have the selected or carefully selected particle diameter, the coat having the designed film thickness cannot be formed and hence the cost of material is increased inevitably, which results in a problem of high manufacturing costs.

Particularly, in the first conventional technique, nature and performance of the coat formed by the pre-heating and the post-heating (formation of the pinholes), the relationship between the line speed and the resin powder and improvement of productivity, and efficient formation of preferable coats are not described at all.

In contrast to the first conventional technique, in the second conventional technique, the temperatures of the pre-heating and the post-heating, the particle diameter of the coating material, and the line speed are specified to improve the productivity and achieve the cost decrease, and efficient formation of a uniform and preferable coat is achieved without impairing the flexibility and the shearing resistance with respect to concrete. However, since the temperature of the pre-heating is high, even when the powder coating material ejected from the electrostatic gun via air conveyance comes into contact with and the outer peripheral surfaces of the untwisted and the loosened core wire and surrounding wires respectively and fuses rapidly in the coating step, the powder coating material having a portion fused partly and lowered in viscosity is pushed by an air conveyance pressure (wind pressure) without welding and is oversprayed (streamed), so that an extremely thin string (cob-webbing phenomenon) may be generated. Since the extremely thin string is light weighted, it floats and is tangled gradually in a coating booth and becomes like cotton fiber (like a cotton candy), is adhered to the coats on the core wire and the surrounding wires in the loosened state, and the surface of the coat is formed with projections or becomes rough, which leads to a shape failure.

SUMMARY OF THE INVENTION

Therefore, it is an object of the invention to solve problems of the conventional techniques by improving a tensile fatigue characteristic without impairing flexibility and an adhesion strength with respect to concrete required for a PC strand, eliminating necessity of selected or carefully selected control of the particle diameter of a resin powder coating material used depending on the relationship between pre-heating and post-heating, improving reduction of material costs by widening a range of the particle diameter of the resin powder coating material, efficiently forming a uniform coat without pinholes, and preventing shape failure due to a cob-webbing phenomenon of the powder coating material even when the line speed is increased to enhance the productivity.

In order to solve the problems of the conventional techniques, there is provided a method of forming a rustproof film on a PC strand comprising a series of steps of: untwisting a PC strand and loosening surrounding wires from a core wire; performing pre-heating while adjusting the core wire and maintaining a loosened state; applying a synthetic resin powder coating material on outer peripheral surfaces of the core wire and surrounding wires and forming a resin coating adhered thereto respectively; performing post-heating; cooling the wires and forming resin films individually on outer peripheral surfaces of the core wire and the surrounding wires; and twisting the surrounding wires on the core wire into an original state, wherein the thickness of the resin film is set to 200±80 μm, the pre-heating is performed within a temperature range from 60 to 150° C. so as to prevent an occurrence of a cob-webbing phenomenon as a result of melting of the synthetic resin powder coating material and the post-heating is performed within a temperature range from 150 to 250° C. in order to uniformize the thickness of the coating adhered respectively to the outer peripheral surfaces of the core wire and the surrounding wires, and the temperature of the pre-heating is set to a temperature lower than the temperature of the post-heating, and the synthetic resin powder coating material including particles having diameters in a range from 0.1 to 250 μm is used, and the line speed in the series of steps is set to 5 to 10 m/min.

Preferably, the temperature of the pre-heating is set to be at least 20° C. lower than the temperature of the post-heating.

According to the method of forming a rustproof film on a PC strand of the invention, a variety of advantages and effects as described below are achieved. The heating includes the pre-heating before applying the synthetic resin powder coating material and the post-heating after the application, and the temperature of the pre-heating is set to be a temperature lower than the temperature of the post-heating. Therefore, even when the synthetic resin powder coating material to be applied including particles having diameters distributed in a range from 0.1 to 250 μm is used, the applied powder coating material is not abruptly heated and melted, and the air present in the gaps among the powder coating material particles is exhausted and hence is not trapped therein before the hardening reaction makes progress gently and hence the viscosity is increased. Accordingly, the foaming phenomenon does not occur, and hence the formation of the pinholes is prevented and the cob-webbing phenomenon is eliminated. Also, by increasing the temperature of the post-heating, the resin film formed by being heated and melted is formed to have a uniform thickness and a smooth surface as a whole. Therefore, even when an inexpensive powder coating material in which the particle diameter is not carefully selected is used, productivity is improved by setting the line speed to 5 to 10 m/min, and achieving cost reduction and, in addition, a uniform and preferable film is efficiently formed without impairing flexibility and shearing resistance with respect to concrete. In a word, by lowering the temperature of the pre-heating, even when part of the powder coating material is melted, the viscosity of the corresponding part is not lowered so much. Therefore, the powder coating material is not blown out by the air conveyance pressure, and hence the cob-webbing phenomenon does not occur. In addition, the uniform film thickness is achieved by increasing the temperature of the post-heating, and hence a shape failure is prevented.

DETAILED DESCRIPTION OF THE PREFERRED EMBODIMENTS

Figure 1:
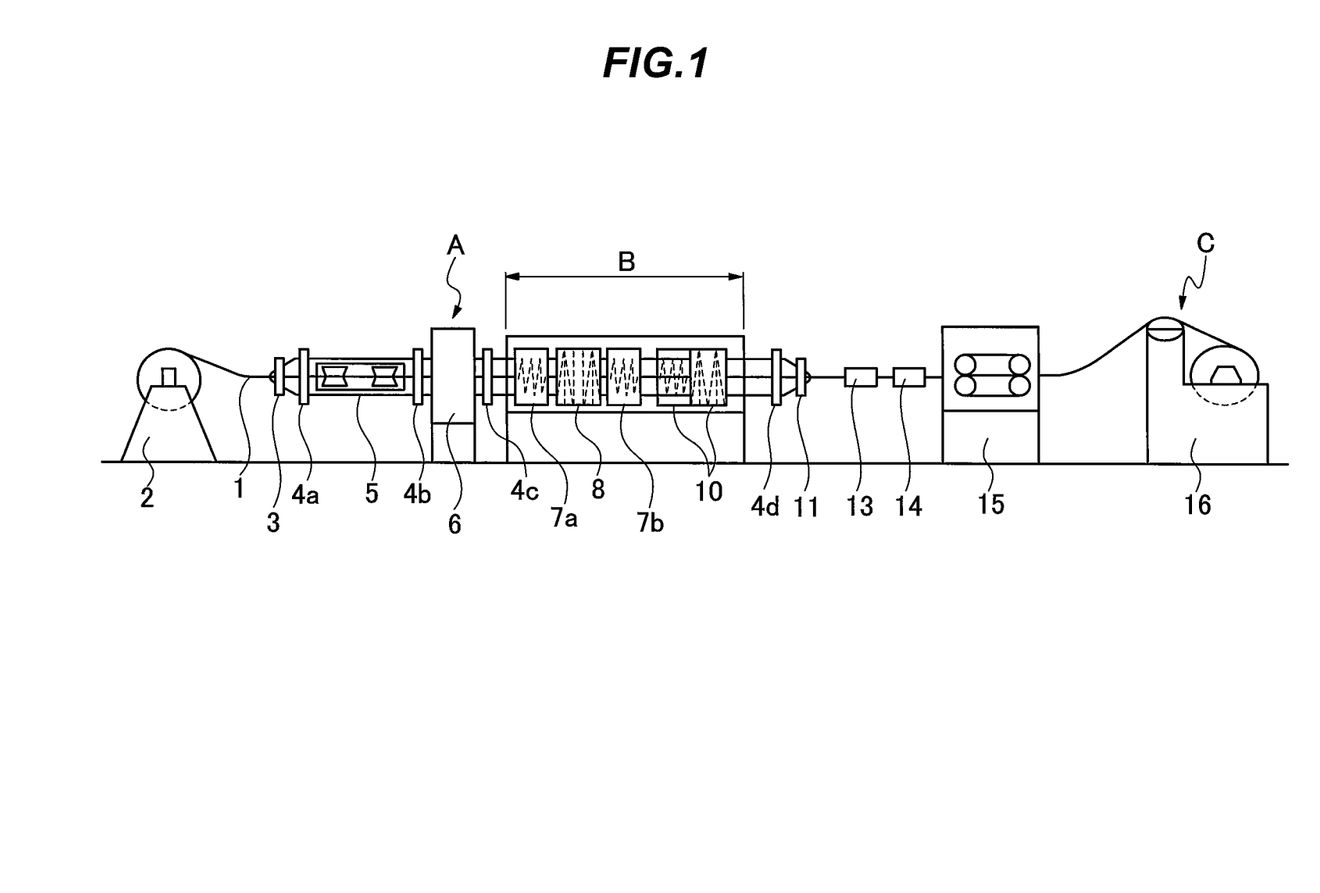
FIG. 1 is a side view illustrating a rough sketch of a process line on which a processing method according to embodiment of the invention is performed.
Figure 2:
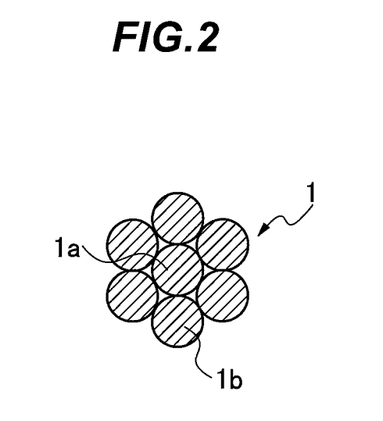
FIG. 2 is a cross-sectional view illustrating a PC strand to be processed by the same processing method.

The invention will be described in detail on the basis of an illustrated embodiment of the invention. FIG. 1 is a schematic drawing illustrating a process line for executing a method of forming and processing a rustproof film on a PC strand according to the invention. As illustrated in FIG. 2, an exemplified PC strand 1 to be used is a PC strand composed of seven wires including a core wire 1a at a center portion thereof and a plurality of (six) surrounding wires 1b on the outer periphery thereof twisted into a helical shape.

In general, the PC strand 1 of this type has an elongated shape and is wound in a coil shape. The wound PC strand 1 is set on a starting side of a process line in a state of the coil-shape and is subjected to a rustproof film forming and processing process while being unwound in sequence from one end side as that of the conventional technique.

The outline of the steps of the process line according to the invention is that a cradle 2 on which the coiled PC strand 1 is set is provided and the PC strand 1 set on the cradle 2 is fed in sequence toward the respective steps for the rustproof film forming and processing process. In other words, the steps of the process line includes, the pre-processing step A and a coating step B in which, the PC strand 1 has been restored to the original twisted state, and a winding step C for winding the coated PC strand into the coil shape on the terminal side of the process line. The respective steps will be described below.

First of all, when starting a continuous operation, a dummy PC strand of the same type is used and inserted in a state in line with categories or methods of the respective steps from a starting end to a terminal end of the process line by a manual operation, and ends of the core wire 1a and the surrounding wires 1b of the PC strand 1 set on the cradle 2 and subjected newly to a rustproof process, and ends of the corresponding core wire and surrounding wires of the dummy PC strand are welded respectively in abutted state as a preparatory work, and the continuous operation is started alter the preparatory work is ended.

When the operation of the apparatus is started, the PC strand 1 moves from the starting end side to the terminal end side at a constant speed, and in the mean time, uniform films (applied coatings) are formed on the respective outer peripheral surfaces of the core wire 1a and the respective surrounding wires 1b and the PC strand 1 is wound by a winding apparatus 16 in an original stranded state.

The PC strand 1 set on the cradle 2 firstly passes through the pre-processing step A via a core wire adjusting apparatus 5. In this case, the surrounding wires 1b are untwisted and separated from the core wire 1a by the loosening apparatus 3 illustrated in FIG. 3, and the separate state is maintained by the separate state maintaining apparatuses 4a to 4d illustrated in FIG. 4. The PC strand 1 passes in a state of being maintained in the separate state to the coating step B where a coating is formed at a preset speed.

Figure 3:
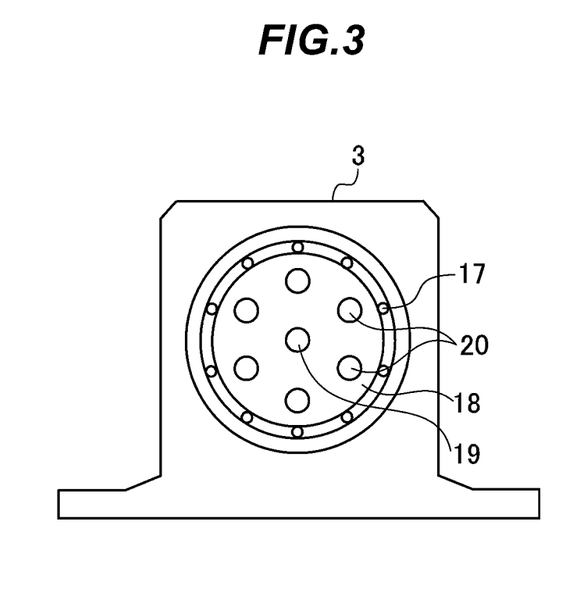
FIG. 3 is a front view schematically illustrating a loosening apparatus (retwisting apparatus) used in the same processing method.

The loosening apparatus 3 includes a rotating ring 18 disposed rotatably via a bearing 17, and the rotating ring 18 is provided with a core wire pass hole 19 through which the core wire 1a of the PC strand 1 is inserted at the center portion thereof, and side cable pass holes 20 where the six surrounding wires 1b are inserted are provided radially at required intervals from the core wire pass hole 19.

Figure 4:
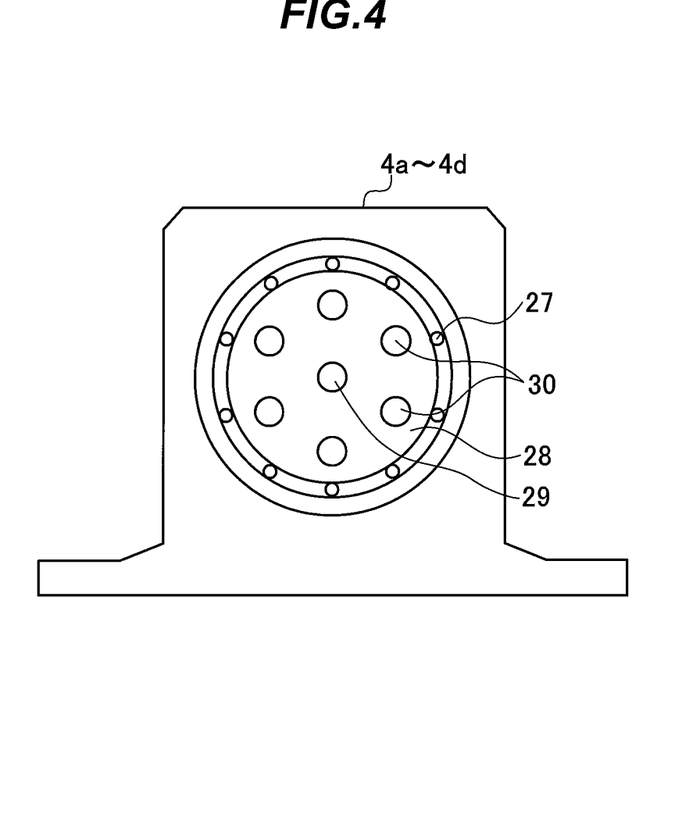
FIG. 4 is a front view schematically illustrating an untwisting apparatus used in the same processing method.

The separate state maintaining apparatuses 4a to 4d have a substantially the same configuration as the loosening apparatus 3 and are slightly larger in diameter than the loosening apparatus 3, are configured to maintain the separate state of the loosened PC strand 1. The separate state maintaining apparatuses 4a to 4d each include a rotating ring 28 disposed rotatably via a bearing 27, and the rotating ring 28 is provided with a core wire pass hole 29 through which the core wire 1a of the PC strand 1 is inserted at the center portion thereof, and side cable pass holes 30 where the six surrounding wires 1b are inserted are provided radially at required intervals from the core wire pass hole 29. A point different from the loosening apparatus 3 is that the distance between the core wire pass hole 29 and the side cable pass holes 30 is increased, and the respective holes have the substantially same size.

In a shot blast apparatus 6 in the pre-processing step A, polishing compound (steel balls on the order of 0.3 mm) is projected on the entire outer peripheral surfaces of the core wire 1a and the surrounding wires 1b in the separate state by a high-speed rotating blade to remove foreign substances such as oil and rust adhered to respective outer peripheral surfaces, and the basis material over the entire outer peripheral surface is adjusted, for example, into a state of pearskin-finished basis material, whereby adhesion or adhesiveness with respect to the coating is improved.

Figure 5:
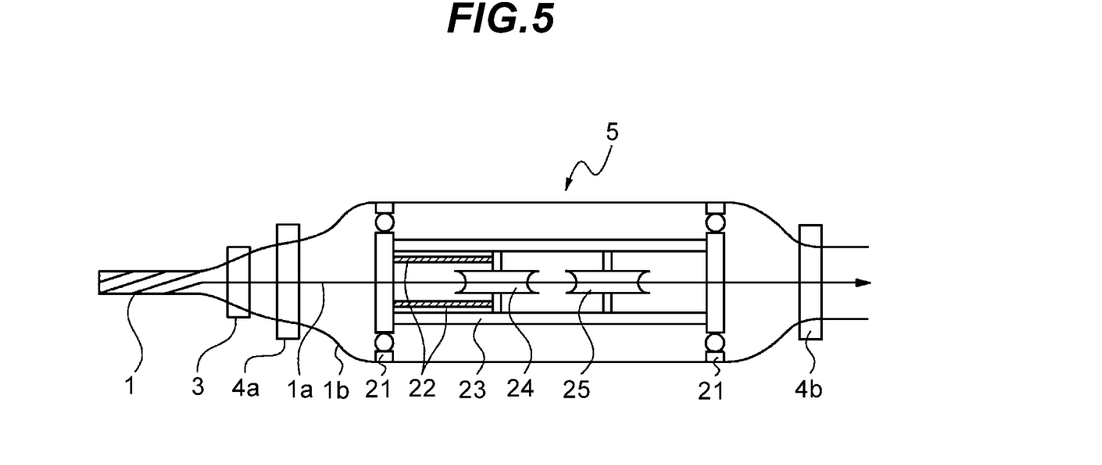
FIG. 5 is a side view schematically illustrating an example of core wire adjusting apparatus used in the same processing method.
Figure 6:
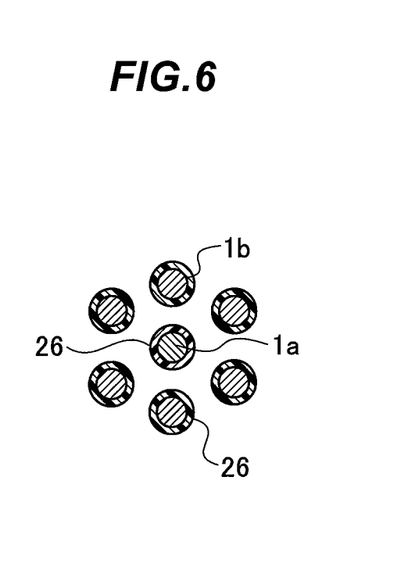
FIG. 6 is a cross-sectional view illustrating the PC strand in the separate state after a coating step in the same processing method.

The core wire adjusting apparatus 5 illustrated in FIG. 5 is disposed between the separate state maintaining apparatuses 4a and 4b between the cradle 2 and the pre-processing step A, and includes a pair of outer wheels 21, a pulley arm 23 configured to maintain the pair of outer wheels 21 at a predetermined distance, a movable pulley 24 movable along the pulley arm and being pulled at a constant tension toward a loosening apparatus 3 by a tensile force adjusting spring 22, and a fixed pulley 25 mounted on the pulley arm 23. The apparatus is configured to guide the surrounding wires 1b on the outside of the outer wheels 21 to allow the both outer wheels 21 to rotate freely corresponding to twisting pitches of the surrounding wires 1b of the PC strand 1. The core wire 1a passed through the core wire pass hole 29 of the separate state maintaining apparatus 4a is adjusted by being hooked firstly on the fixed pulley 25 to be U-turned, then hooked on the movable pulley 24 to reach the separate state maintaining apparatus 4b side, and pulling back a redundant part of the core wire 1a generated by being subjected to the sequential rustproof film formation and restoration of the surrounding wires 1b to the original twisted state.

The distance of movement of the movable pulley 24 or the number of grooves of the pulleys are to be determined depending on the length of the redundant core wire to be absorbed or collected, and, for example, the integrated amount of absorption of redundant core wire becomes four times if two each of the grooves are provided on the pulleys. Since the movable pulley 24 is pulled by the tensile force adjusting spring 22 in a constantly tensed state toward the loosening apparatus 3 side at a constant tension, the redundant core wire 1a generated by the surrounding wires 1b twisted on the core wire 1a to the original state on the terminal end side is automatically absorbed or collected. The core wire adjusting apparatus is not limited to the pulley system.

The core wire 1a and the surrounding wires 1b processed in the pre-processing step A are maintained in an separate state by the separate state maintaining apparatuses 4c and 4d, are supplied to the coating step B while rotating substantially corresponding to the side cable twisting pitches. In the coating step B, the core wire 1a and the surrounding wires 1b are heated by the pre-heating apparatus 7a and resin coatings 26 are formed on the entire outer peripheral surfaces thereof respectively by a powder coating apparatus 8 in an independent manner. Then, the resin coatings 26 are brought into the melted state by pre-heating, and are further heated by the post-heating apparatus 7b to form resin films smoothened substantially uniformly as a whole, and the resin films 26 are sufficiently cooled by a cooling apparatus 10, whereby the surface hardness thereof is enhanced.

The heating apparatuses 7a and 7b are preferably of a high-frequency induction heating type, which allows easy temperature adjustment. The method of supplying the powder coating material may be any of a gun spraying method in which the powder coating material is ejected from the electrostatic gun via air conveyance or a flow dipping method, that is, it is desirable to use an electrostatic powder coating method. Furthermore, the state of formation of the resin film 26, that is, the thickness and the quality are determined by the method of heating, the temperature, the type and the number of the electrostatic gun, the position of arrangement, the state of air, the particle diameter of the powder coating material, and the ratio of mixture thereof.

The cooling apparatus 10 may cool by showering cold water over a certain length and, preferably, cools in two steps. In other words, by providing primary cooling and secondary cooling adjacently, performing gentle cooling of the surface of the resin film by using an air cooling unit which blows cold air, for example, in the primary cooling, and then performing rapid cooling by showering cold water, the surfaces of the resin films 26 are finished substantially uniformly and smoothly.

Figure 7:
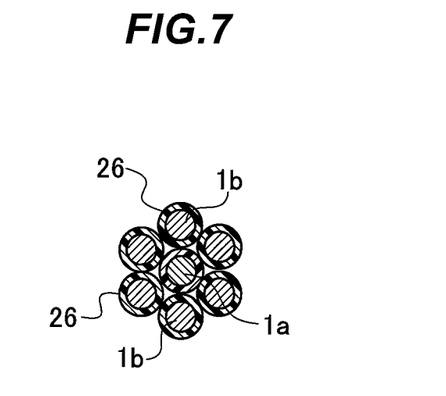
FIG. 7 is a cross-sectional view illustrating the PC strand in a state in which the surrounding wires are twisted on the core wire into an original state after the coating process in the same processing method.

The thickness of the resin films formed in the coating step B is on the order of approximately 200±80 μm, for example, and the surrounding wires 1b is twisted on the core wire 1a into the original state by a retwisting apparatus 11 alter the formation of the resin films in the coating step B. In this state, the retwisting apparatus 11 has actually the same configuration as the loosening apparatus 3 illustrated in FIG. 3 but used by setting in the opposite direction. Therefore, the description will be omitted and expressed as the retwisting apparatus 11. Then, since the surrounding wires 1b are still curled as they are twisted, and the surrounding wires 1b may be twisted in the original state quickly on the core wire 1a. The cross-sectional shape of the PC strand 1 twisted in the original state are is as illustrated in FIG. 7, and the resin films having the uniform thickness are formed on the entire circumference of the core wire 1a and the surrounding wires 1b.

The PC strand twisted into the original state alter the formation of the resin films is subjected to measurement of the surface film thickness by a film thickness measuring apparatus 13 as a film inspecting apparatus, and if the film thickness is out of an predetermined allowable value, issues an alarm to notify that effect, and issues a signal indicating whether the film thickness is smaller than the allowable value or exceeding the allowable value. In addition, the state of the coat is inspected by a pinhole detecting apparatus 14. In the inspecting method, a non-contact type, for example, an optical type detecting unit is used so as to avoid damaging the film and, if the pinhole is detected, the position where the pinhole is detected is marked and an alarm signal is issued.

The PC strand 1 inspected in this manner is pulled by a drawer 15. The drawer 15 has a structure that does not cause damage on the resin films, which has a pair of endless belts disposed on upper and lower parts thereof. The drawer 15 serves as a speed setting apparatus of the process line, and hence an inverter motor is employed so as to be capable of converting the line speed freely. If the temperature conditions of the pre-heating and the amount of discharge of the resin powder coating material are the same, the film thickness to be formed varies depending on the line speed, so that the film having an arbitrary thickness may be formed by selecting the line speed.

At the timing when the continuous operation makes progress and the PC strand 1 set on the cradle 2 has been used up, driving of the process line is stopped and the resin film formation is temporarily stopped, a new PC strand is set on the cradle 2, and the rear end on the end side of the previous PC strand 1 and the distal end of a newly set PC strand 1 are welded and connected, whereby the operation is restarted.

The PC strand 1 formed in this manner is formed with the resin films in an independent or separately on the surfaces of the core wire 1a and the surrounding wires 1b, and hence flexibility required by the PC strand of this type is not lost and the corrosion resistance and tensile fatigue resistant characteristic may be improved.

The method of forming a rustproof film on the PC strand according to this application may allow utilization of the powder coating material having a wide range of the particle diameters without sticking to the particle diameter of the powder coating material to be used specifically depending on the conditions relating to the line speed and the heating temperature, whereby the PC strand formed by using an inexpensive powder coating material without controlling the selected or carefully selected powder coating material, increased in production efficiency, and formed with a preferable resin film is obtained. The conditions are as follows, and will be described with reference to a graph in FIG. 8 in which indicates the relationship between the line speed and the heating temperature in the process line illustrated in FIG. 1.

Figure 8:
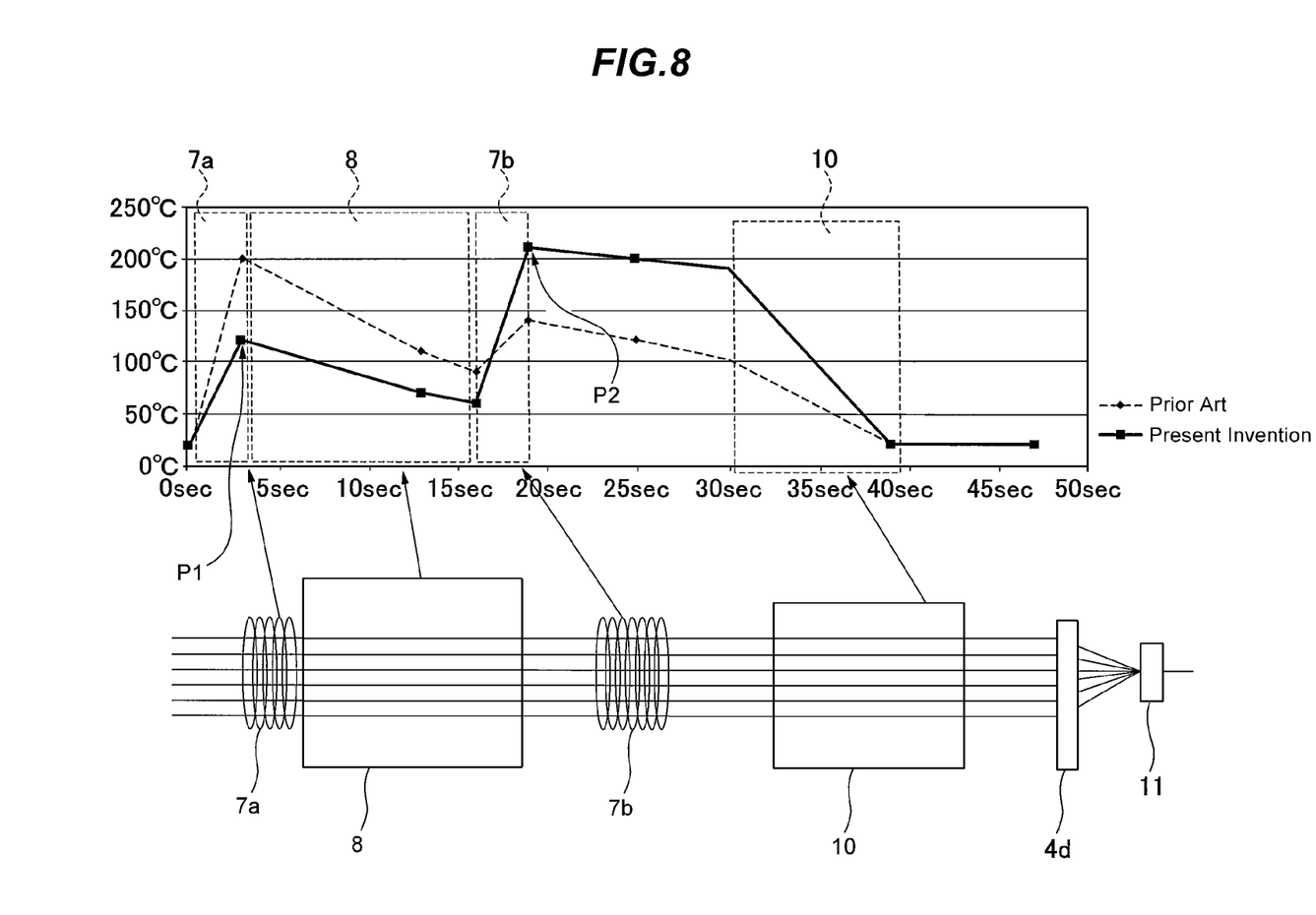
FIG. 8 is a graph illustrating a relationship between a line speed and a heating temperature in the process line illustrated in FIG. 1.

The line speed is 5 to 10 m/min, and improvement of productivity is not expected at speeds lower than 5 m/min, and hence costs are increased, which is disadvantageous in terms of economy. When the line speed exceeds 10 m/min, the twisting is restored (retwisting) before the coated powder coating material is sufficiently hardened. Therefore, the resin films formed independently on the core wire 1a and the surrounding wires 1b adhere to each other and partial deformation may results due to a pressing force by the retwisting. Accordingly, there arise problems not only of impairment of uniformity but also of impairment of required flexibility. The most preferable line speed is 7 to 8 m/min. However, the applicable lower limit is 5 m/min, and the applicable upper limit is 10 m/min.

In order to elongate the hardening time of the coating material, elongation of the distance of separation after the coating is conceivable. However, since the coating process is performed in a state of separating the wires while maintaining the curling of the stranded portion of the respective surrounding wires 1b with respect to the core wire 1a, the length of maintenance of the separate state, that is, the focal distance for retwisting to the original state is set in a certain range. If the length is longer than that range, the elemental wires (the core wire or the surrounding wires) may sag and come into contact with the peripheral equipment when rotating or the elemental wires may come into contact with each other, which may cause a problem in production. Therefore, the length of maintenance of the separate state cannot be increased.

The used powder coating material is thermosetting epoxy resin and, as regards the particle diameter of the powder, it is preferable that the powder in which particles ranging from a minimum particle diameter of 0.1 μm to a maximum particle diameter of 250 μm having an average particle diameter from 10 to 100 μm are uniformly distributed are used. If the particle diameter is small, the thin coat being superior in uniformity is obtained, and if the particle diameter is large, the coat having a large thickness is obtained. However, in the coating area, the redundant powder coating is generally divided in dust collection and recycling steps. If the powder coating material includes only particles having diameters equal to or smaller than 10 μm, the amount collected by a dust collector and discarded in an unused state is increased. In contrast, if the powder coating material includes only particles having diameters exceeding 100 μm, the amount sucked by the dust collector is reduced and hence the loss is decreased. However, a foaming phenomenon appears between the basis material and the coating, and the coating is susceptible to formation of the pinholes.

However, in the coating area, even when the electrostatic coating means is employed and the sucking force of the dust collector is reduced, the temperature of the pre-heating is reduced and the powder coating material having particle diameters from 0.1 to 250 μm is used in relation to the line speed, the coating material having small particle diameters of 10 μm or smaller is adsorbed quickly to the surface of the wires by static electricity without being sucked by the dust collector, and the gaps in the large-diameter coating material are evenly filled in relation to the large-diameter coating material having particle diameters of 100 μm or larger. Simultaneously, the powder coating material is melted quickly even at low temperatures and air in the gaps among particles in the subsequently melted large-diameter coating material is eliminated and is prevented from being trapped, so that the pinholes are not formed and the coating alter the application is prevented from becoming non-uniform. Therefore, the powder coating material in which particles having diameters ranged from 0.1 to 250 μm and having an average particle diameter from 10 to 100 μm are distributed as a whole may be used, and an inexpensive powder coating material having a wide range of particle diameters which are not selected or carefully selected may be used.

The heating temperature of the elemental wires by the pre-heating apparatus 7a is set to a temperature from 60 to 150° C. and the heating temperature by the post-heating apparatus 7b is set to a temperature from 150 to 250° C. The temperature settings in this case are peak temperatures P1 and P2 of the elemental wires heated by the heating apparatuses 7a and 7b respectively at an exit. Although the heated elemental wires 1a and 1b are introduced into the powder coating apparatus 8 and the temperatures thereof are gradually lowered, and in the meanwhile, the powder coating material is applied to the outer peripheral surfaces of the elemental wires. In a word, the electrostatic powder coating is performed while setting the temperature of the pre-heating to a temperature lower than the temperature of the post-heating by 20° C. or more and in addition, the powder coating material adhered to the elemental wires is gradually melted by lowering of the temperature of the elemental wires in the coating booth. Accordingly, the melting viscosity of the coating is maintained at a high level, and hence the powder coating material is not blown out by air ejected from the electrostatic gun via air conveyance. Therefore, the powder coating material is applied without causing the cob-webbing phenomenon, and the air present between the applied powder particles is exhausted gradually, whereby a coating without including air bubbles trapped therein is achieved. Subsequently, the powder coating material is further heated by the post-heating at a temperature higher than the pre-heating within a temperature range that does not cause thermal denaturation of resin to accelerate a hardening reaction. Since the coating does not contain the air bubbles trapped therein, the resin film having a uniform film thickness is obtained without forming the pinholes and, in addition, the resin film is prevented from becoming uneven and is finished smoothly as a whole without causing any shape failure. Subsequently, the resin film is cooled by water and hardened.

Under such conditions, the method of forming a rustproof film on a PC strand was performed. First of all, the powder coating material the same as that described above was used. The heating temperature was set, for example, to 90° for the pre-heating and 200° C. for the post-heating, and the film having a thickness from 60 μm to 220 μm was formed while changing the setting of the line speed variously. Incidentally, a film thickness of 150 μm was obtained when the line speed was set to 7 m/min, and the speed was increased from that speed by 1 m/min. A film thickness of 110 μm was obtained when the speed was 10 m/min. In contrast, when the speed was decreased from that speed by 0.5 m/min, a film thickness of 220 μm was obtained at 6 m/min. When the temperature of the pre-heating is increased to a temperature close to a peak temperature (120° C.) and the amount of discharge of the resin powder coating material is increased a little, the film thickness is increased by necessity even the speed is the same.

The PC strands obtained as above were subjected to a salt spray test, which was performed for 1,000 hours with a salt spray tester according to the JIS Z2371 "salt spray testing method" (spray tower method). The test results are as shown in Table 1.

TABLE 1

| applied film thickness | time until rusting is started ||||||
|---|---|---|---|---|---|---|
| | 48 hours | 120 hours | 216 hours | 360 hours | 500 hours | 1,000 hours |
| 60 μm | * | x | x | x | x | x |
| 70 μm | o | * | x | x | x | x |
| 80 μm | o | o | * | x | x | x |
| 90 μm | o | o | o | * | x | x |
| 100 μm | o | o | o | o | o | o |
| 110 μm | o | o | o | o | o | o |
| 120 μm | o | o | o | o | o | o |
| 130 μm | o | o | o | o | o | o |
| 150 μm | o | o | o | o | o | o |
| 180 μm | o | o | o | o | o | o |
| 220 μm | o | o | o | o | o | o |

* Rusting started
x: Rusting
o: Normal

The result shown in the table is average results. For example, when the temperature of the pre-heating is set to a high temperature (to 120° C.), the amount of adhesion of the powder coating material is increased, so that the film thickness is increased a little. In a word, the powder coating material includes particles having a variety of diameters from small diameters to large diameters mixed together. When the temperature of the pre-heating is set to a low temperature and the temperature of the post-heating is set to a high temperature, particles having small diameters enter the gaps among particles having large diameters and hence the gaps among the particles of the coating material are filled. Therefore, the powder coating material is melted gently and the air present among the particles of the coating material is quickly exhausted without causing the cob-webbing phenomenon and hence the air bubbles are prevented from being trapped therein. Accordingly, a uniform and smooth film without the pinholes is formed as a whole, and the film is superior in rustproof property or anti-rust property.

INDUSTRIAL APPLICABILITY

The method of forming a rustproof film on a PC strand of the invention prevents occurrence of the cob-webbing phenomenon and hence prevents occurrence of a shape failure without using an expensive powder coating material having carefully selected particle diameters by widening the particle diameter of a synthetic resin powder coating material to be used, setting the temperature of the pre-heating before application to be at least 20° C. lower than the post-heating, and combining with the line speed in a rational manner, and is capable of forming a uniform and desirable film without forming pinholes and without impairing flexibility and a shearing resistance with respect to concrete efficiently while improving productivity. Therefore, the method of forming a rustproof film on a PC strand may be utilized widely in the rustproof processing technology for a PC strand of this type.

What is claimed is:

1. A method for forming a rustproof film on a PC strand comprising a series of steps of:

untwisting a PC strand and loosening surrounding wires from a core wire;

performing pre-heating while adjusting the core wire and maintaining a loosened state;

applying a synthetic resin powder coating material on outer peripheral surfaces of the core wire and surrounding wires and forming a resin coating adhered thereto respectively;

performing post-heating;

cooling the wires and forming resin films individually on outer peripheral surfaces of the core wire and the surrounding wires; and twisting the surrounding wires on the core wire into an original state, wherein the thickness of the resin film is set to 200±80 µm, the pre-heating is performed within a temperature range from 60 to 150° C. so as to prevent an occurrence of a cob-webbing phenomenon as a result of melting of the synthetic resin powder coating material and the post-heating is performed within a temperature range from 150 to 250° C. in order to uniformize the thickness of the coating adhered respectively to the outer peripheral surfaces of the core wire and the surrounding wires, and the temperature of the pre-heating is set to a temperature lower than the temperature of the post-heating, the synthetic resin powder coating material including particles having diameters in a range from 0.1 to 250 µm is used, and the line speed in the series of steps is set to 5 to 10 m/min, and wherein the temperature of the pre-heating is set to be at least 20° C. lower than the temperature of the post-heating.

2. A method for forming a rustproof film on a PC strand, the method comprising:

untwisting a PC strand and loosening surrounding wires from a core wire;

performing pre-heating;

applying a synthetic resin powder coating material on outer peripheral surfaces of the core wire and surrounding wires and forming a resin coating adhered thereto respectively;

performing post-heating;

cooling the wires and forming resin films individually on outer peripheral surfaces of the core wire and the surrounding wires; and twisting the surrounding wires on the core wire, wherein the thickness of the resin film is 200±80 µm, wherein the pre-heating is performed within a temperature range from 60 to 150° C. and the post-heating is performed within a temperature range from 150 to 250° C., wherein the synthetic resin powder coating material includes particles having diameters in a range from 0.1 to 250 µm, wherein the line speed in the untwisting, pre-heating, applying the synthetic resin powder coating material, post-heating, cooling, and twisting operations is 5 to 10 m/min, and wherein the temperature of the pre-heating is at least 20° C. lower than the temperature of the post-heating.

* * * * *